(12) United States Patent  
Deguchi

(10) Patent No.: US 10,732,099 B2  
(45) Date of Patent: Aug. 4, 2020

(54) GAS ANALYSIS DEVICE AND GAS ANALYSIS METHOD USING LASER BEAM

(71) Applicant: TOKUSHIMA UNIVERSITY, Tokushima (JP)

(72) Inventor: Yoshihiro Deguchi, Tokushima (JP)

(73) Assignee: Tokushima University, Tokushima (JP)

( * ) Notice: Subject to any disclaimer, the term of this patent is extended or adjusted under 35 U.S.C. 154(b) by 30 days.

(21) Appl. No.: 16/068,087

(22) PCT Filed: Dec. 20, 2016

(86) PCT No.: PCT/JP2016/087949  
§ 371 (c)(1),  
(2) Date: Jul. 3, 2018

(87) PCT Pub. No.: WO2017/119283  
PCT Pub. Date: Jul. 13, 2017

(65) Prior Publication Data  
US 2019/0049368 A1    Feb. 14, 2019

(30) Foreign Application Priority Data

Jan. 6, 2016   (JP) ................................ 2016-000897

(51) Int. Cl.  
*G01N 21/27*   (2006.01)  
*G01N 21/39*   (2006.01)  
(Continued)

(52) U.S. Cl.  
CPC ............. *G01N 21/27* (2013.01); *G01N 21/39* (2013.01); *G01N 21/031* (2013.01); *G01N 21/3504* (2013.01)

(58) Field of Classification Search  
CPC ..................................................... G01N 21/27  
(Continued)

(56) References Cited

U.S. PATENT DOCUMENTS

2009/0124918 A1*  5/2009  Stockmann .......... A61B 5/0836  
                                                                    600/532  
2009/0164138 A1   6/2009  Goto et al.  
(Continued)

FOREIGN PATENT DOCUMENTS

JP    2003344277 A    12/2003  
JP    2007163422 A     6/2007  
(Continued)

OTHER PUBLICATIONS

International Search Report and Written Opinion dated Feb. 15, 2017 for PCT No. PCT/JP2016/087949, 2 pages.  
(Continued)

*Primary Examiner* — Kara E. Geisel  
*Assistant Examiner* — Omar H Nixon  
(74) *Attorney, Agent, or Firm* — Dorsey & Whitney LLP

(57) ABSTRACT

A gas analysis device includes a laser light source configured to output a laser beam, an irradiation unit configured to irradiate a measurement region including measurement target gas with the laser beams in plural directions, plural photoreceivers each configured to receive a laser beam having passed through the measurement region and output an electric signal according to intensity of the received laser beam, and an analyzer configured to analyze the physical state of the measurement target gas based on the electric signal output from each photoreceiver. The analyzer sets a function (e.g. two-dimensional polynomial f(X,Y)) representing the physical state (e.g. concentration, temperature) of the target gas at least in the measurement region, and measures the physical state of the target gas by determining a coefficient of each of terms included in the function based on a measured value obtained from the electric signal output from the photoreceiver.

11 Claims, 14 Drawing Sheets

(51) Int. Cl.
*G01N 21/3504* (2014.01)
*G01N 21/03* (2006.01)

(58) Field of Classification Search
USPC .......................................................... 356/437
See application file for complete search history.

(56) References Cited

U.S. PATENT DOCUMENTS

| | | | |
|---|---|---|---|
| 2009/0229250 | A1 | 9/2009 | Yamakage et al. |
| 2009/0292484 | A1* | 11/2009 | Wiklund ............... G01F 1/363 702/47 |
| 2010/0149538 | A1 | 6/2010 | Fleischer et al. |
| 2010/0241361 | A1 | 9/2010 | Hofvander et al. |
| 2011/0180148 | A1* | 7/2011 | Xia ................... B01F 3/04106 137/1 |
| 2012/0203472 | A1* | 8/2012 | Lacombe ............. G01N 21/274 702/30 |
| 2016/0178517 | A1 | 6/2016 | Deguchi et al. |
| 2018/0031233 | A1 | 2/2018 | Oka et al. |

FOREIGN PATENT DOCUMENTS

| | | |
|---|---|---|
| JP | 2007178369 A | 7/2007 |
| JP | 2010510507 A | 4/2010 |
| JP | 2010528296 A | 8/2010 |
| JP | 2015040747 A | 3/2015 |
| JP | 2016186464 A | 10/2016 |

OTHER PUBLICATIONS

Lin Ma et al, "50-kHz-rate 2D imaging of temperature and H2O concentration at the exhaust plane of a J85 engine using hyperspectral tomography" Optics Express, Jan. 14, 2013.

Paul Wright et al, "High-speed chemical species tomography in a multi-cylinder automotive engine," Elsevier, Oct. 17, 2008.

Weiwei Cai et al, "A tomographic technique for the simultaneous imaging of temperature, chemical species, and pressure in reactive flows using absorption spectroscopy with frequency-agile lasers," Applied Physics Letters, Jan. 21, 2014.

Weiwei Cai et al, "Multiplexed absorption tomography with calibration-free wavelength modulation spectroscopy," Applied Physics Letters, Apr. 17, 2014.

English translation of the International Preliminary Report on Patentability dated Jul. 12, 2018 for PCT Application No. PCT/JP2016/087949.

* cited by examiner $$f(X,Y) = \sum_{k=0}^{m} \sum_{i=0}^{k} a_{k-i,i} X^{k-i} Y^{i}$$

$f_2(X,Y)$ $f_1(X,Y)$

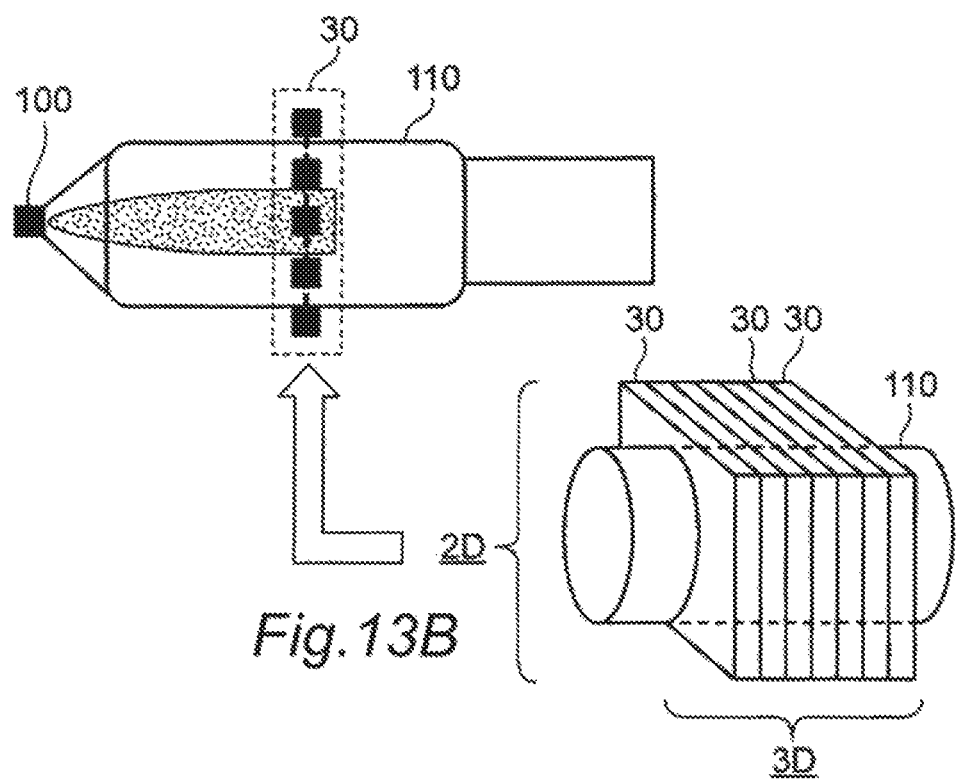

GAS ANALYSIS DEVICE AND GAS ANALYSIS METHOD USING LASER BEAM

RELATED APPLICATIONS

This application is a U.S. National Stage filing under 35 U.S.C. § 371 of PCT Application No. PCT/JP2016/087949, filed Dec. 20, 2016, which claims priority to Japanese Patent Application No. 2016-000897 filed Jan. 6, 2016, which applications are incorporated herein by reference in their entirety, for any purpose.

TECHNICAL FIELD

The present invention relates to a gas analysis device and a gas analysis method that detect a physical state (for example, concentration or temperature) of target gas by using a laser beam.

BACKGROUND ART

Recently, interest on global environment conservation and effective energy use has been growing in various fields to prevent global warming, fossil fuel depletion, environmental contamination, and the like, and thus various kinds of environmental technologies have been researched.

In such environmental technologies, it is important to understand a combustion structure of a combustion phenomenon in an engine, a burner, or the like, and transitional behavior thereof in detail. Recently, measurement technologies utilizing a semiconductor laser absorption spectroscopy have been developed as means for measuring temperature and concentration distributions of combustion gas in a highly responsive and temporally sequential manner.

Typically, an absorption spectroscopy is a measurement method utilizing property that gas molecules absorb infrared light having a wavelength unique to a chemical species, and temperature and concentration dependency of the amount of absorption. The concentration and temperature of an absorption medium (target gas) having a uniform optical path length can be measured by obtaining the ratio ($I_\lambda/I_{\lambda 0}$) of the intensity ($I_{\lambda 0}$) of incident light to the intensity of transmitted light ($I\lambda$) having passed through the target gas.

The technology disclosed in Patent Literature 1 is a technology of detecting properties (concentration and temperature) of measurement target gas by the absorption method using a semiconductor laser.

PRIOR ART DOCUMENT

Patent Document

Patent Document 1: JP 2015-040747 A

SUMMARY OF THE INVENTION

Problems to be Solved by the Invention

In some methods, the intensity ratio of incident light and transmitted light for measurement target gas is two-dimensionally measured, and a two-dimensional image of a measurement place is reconstructed by using a computed tomography (CT; computer tomographic imaging) technology. Accurate reconstruction of a two-dimensional image by using the CT technology requires information of a large number of paths.

However, when a large number of paths are provided, it takes time to analyze the measurement target gas, and thus it takes time to reconstruct a two-dimensional image. For this reason, it has been practically difficult to accurately achieve the reconstruction of a two-dimensional image in fields in which the combustion state, which momentarily changes, needs to be determined in real time.

The present invention provides a gas analysis device and a gas analysis method that can accurately analyze measurement target gas in a short time.

Means for Solving Problem

In one aspect of the invention, a gas analysis device for analyzing a physical state of measurement target gas in a two-dimensional or three-dimensional region is provided. The gas analysis device includes a laser light source configured to output a laser beam, a laser control unit configured to control the laser light source, a splitter configured to divide the laser beam from the laser light source into a plurality of beams corresponding to a plurality of optical paths, an irradiation unit configured to irradiate a measurement region including measurement target gas with the laser beams in a plurality of directions, a plurality of photoreceivers each configured to receive a laser beam having passed through the measurement region, and output an electric signal in accordance with intensity of the received laser beam, and an analyzer configured to analyze the physical state of the measurement target gas based on the electric signal output from each photoreceiver. The analyzer sets a function representing the physical state of the measurement target gas at least in the measurement region, and measures the physical state of the measurement target gas by determining a coefficient of each of terms included in the function based on a measured value obtained from the electric signal output from the photoreceiver.

In a second aspect of the invention, a gas analysis method of analyzing a physical state of measurement target gas in a two-dimensional or three-dimensional region is provided. The gas analysis method includes comprising the steps of irradiating a measurement region including measurement target gas with laser beams in a plurality of directions, receiving laser beams having passed through the measurement region, analyzing a physical state of the measurement target gas based on information of the received laser beams. The analyzing step sets a function representing the physical state of the measurement target gas at least in the measurement region, and determines a coefficient of each of terms included in the function based on a measured value obtained from the information of the received laser beams.

Effects of Invention

According to the present invention, measurement target gas can be accurately analyzed in a short time.

BRIEF DESCRIPTION OF DRAWINGS

FIGS. 13A and 13B are diagrams for explaining exemplary application of the measurement target cell according to the embodiment of the present invention to a burner.

MODE FOR CARRYING OUT THE INVENTION

The following describes a measurement cell used in a gas analysis device according to embodiments of the present invention with reference to the accompanying drawings.

Embodiment 1

1. Configuration of Gas Analysis Device

Figure 1:
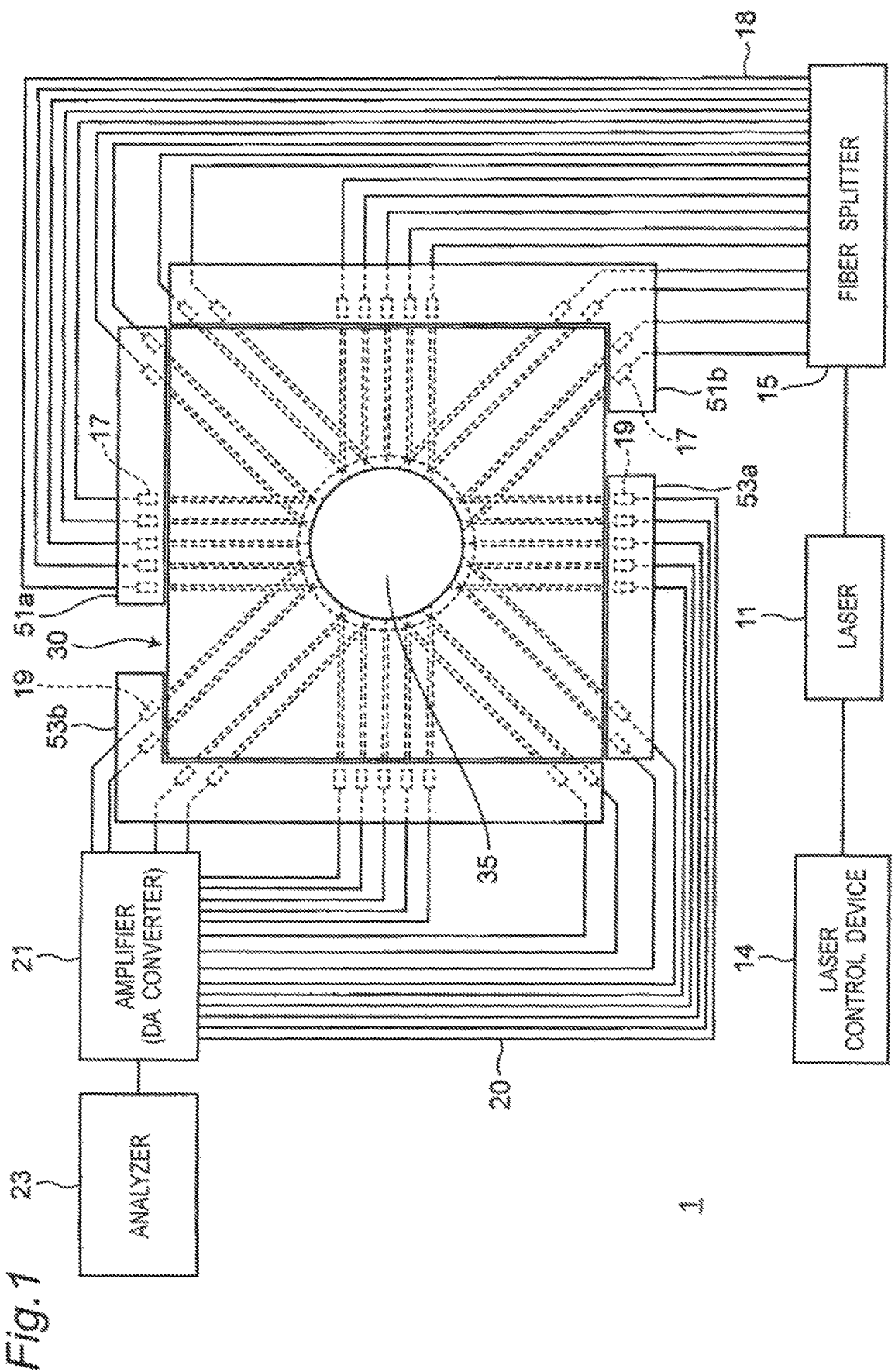
FIG. 1 is a diagram illustrating the configuration of a gas analysis device according to an embodiment of the present invention.

FIG. 1 is a diagram illustrating the configuration of a gas analysis device according to an embodiment of the present invention. The gas analysis device is capable of two-dimensionally measuring the concentration and temperature of measurement target gas. As illustrated in FIG. 1, this gas analysis device 1 includes a laser 11, a laser control device 14, a fiber splitter 15, a measurement cell 30, an amplifier 21, and an analyzer 23.

The laser 11 is a light source (laser diode) capable of outputting a laser beam in a predetermined wavelength band, and is achieved by, for example, a DFB laser.

The laser control device 14 controls the laser 11 to control the wavelength and intensity of a laser beam output from the laser 11. Specifically, the laser control device 14 controls the laser 11 to output a laser beam while temporally changing (scanning) the wavelength of the laser beam. The laser control device 14 may be achieved by various kinds of commercially available devices configured to apply current to a laser diode to cause (drive) the laser diode to emit light, and may be, for example, LD driver ALP-7033CC manufactured by Asahi data systems Ltd.

The fiber splitter 15 branches and outputs a laser beam from the laser 11 into a plurality of optical paths.

The measurement cell 30 is disposed and used in a measurement place including measurement target gas, and defines optical paths of a laser beam in the measurement place. The laser beam is emitted from the measurement cell 30 to the measurement target gas. The laser beam having passed through the measurement target gas is incident into the measurement cell 30 again.

The measurement cell 30 is provided with optical adapters 51a, 51b, 53a, and 53b. Each of the optical adapters 51a and 51b includes a plurality of collimators 17 therein. The optical adapters 51a and 51b are each connected with the fiber splitter 15 through an optical fiber 18. The collimator 17 is an optical member (lens) for adjusting the traveling direction of a laser beam.

The optical adapters 53a and 53b include a plurality of photoreceivers 19 therein, respectively. Each photoreceiver 19 included in the optical adapters 53a and 53b is disposed opposite to the corresponding collimator 17 in the optical adapters 51a and 51b. The photoreceiver 19 includes a light receiving element such as a photodiode or a phototransistor, receives a laser beam having passed through measurement target gas, and converts the received laser beam into an electric signal in accordance with the intensity of the received laser beam. The optical adapters 53a and 53b are each connected with the amplifier 21 through a wire 20 for transferring an electric signal.

The measurement cell 30 includes a circular opening 35 at the center. When used, the measurement cell 30 is disposed so that the opening 35 is disposed in the measurement place.

The amplifier 21 amplifies an electric signal (analog signal) from each photoreceiver 19 and converts the analog signal into a digital signal.

The analyzer 23 receives the signal from the amplifier 21, analyzes the waveform (absorption spectrum) of the received signal to obtain concentration and temperature distributions of the gas, and generates two-dimensional images each illustrating the concentration distribution or the temperature distribution.

Figure 2:
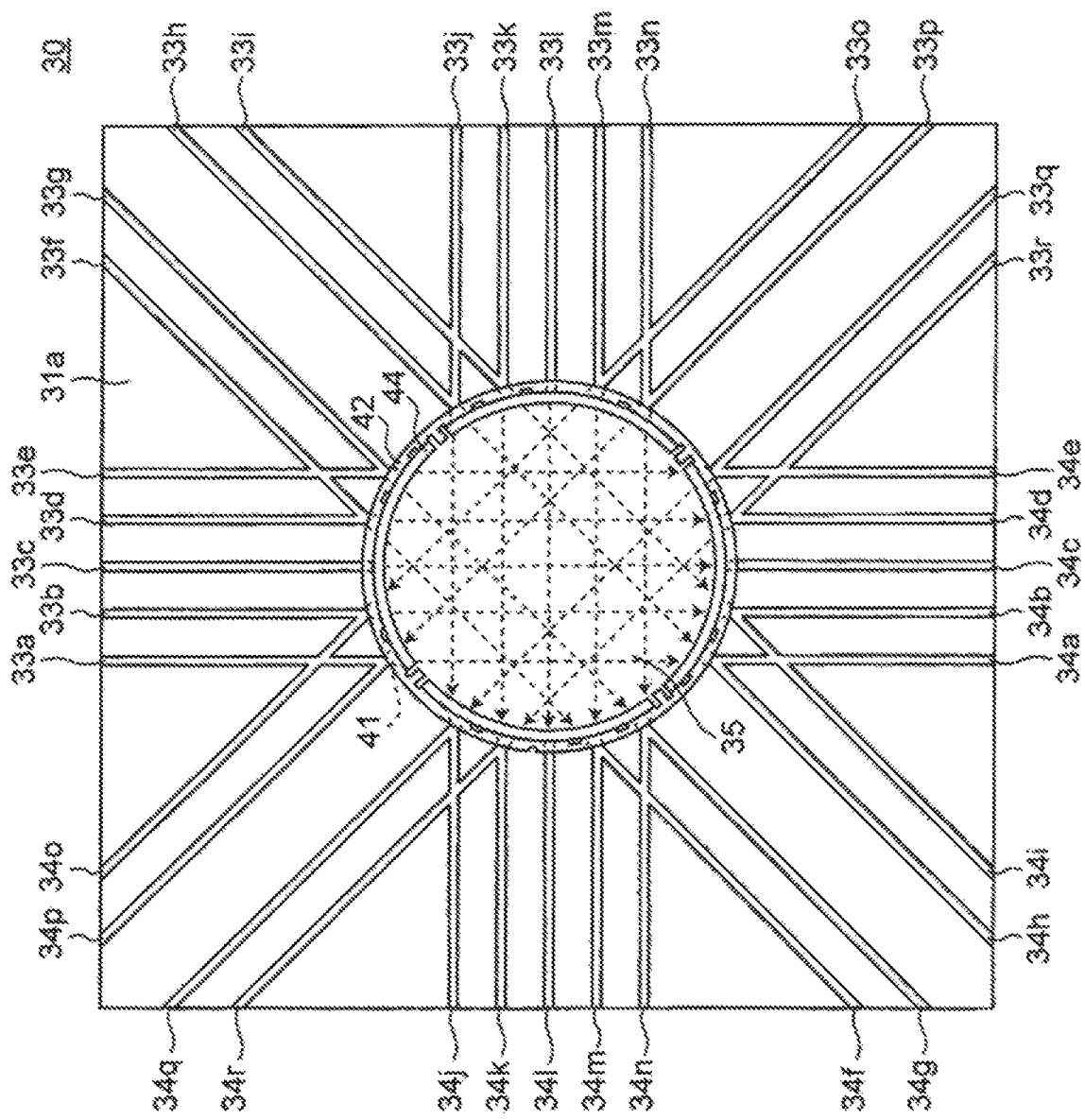
FIG. 2 is a diagram illustrating paths in a measurement cell of the gas analysis device.

FIG. 2 is a cross-sectional view of a housing 31a of the measurement cell 30 taken along a plane parallel to a principal surface of the measurement cell 30 for explanation of the internal configuration of the housing 31a of the measurement cell 30. The measurement cell 30 includes the opening 35 at a central part. A translucent window member 44 and a holding frame 42 for holding the window member are disposed around the opening 35.

In addition, first optical paths 33a to 33r and second optical paths 34a to 34r extending radially from the opening 35 are formed in the housing 31a of the measurement cell 30. The first optical paths 33a to 33r are paths for guiding laser beams from the optical adapters 51a and 51b (collimators 17) to the opening 35 (in other words, the measurement place) of the measurement cell 30. The second optical paths 34a to 34r are paths for guiding light having passed through the opening 35 to the photoreceivers 19 of the optical adapters 53a and 53b. Light transmission holes 41 are provided through a side surface of the holding frame 42 at positions corresponding to the optical paths 33a to 33r and 34a to 34r.

Each collimator 17 and the photoreceiver 19 are paired therewith to form a path in the opening 35 of the measurement cell 30. In FIG. 2, a dashed line arrow illustrated in the opening 35 indicates each path. In the present embodiment, the measurement cell 30 includes eighteen paths. The paths are formed in the same plane in which two-dimensional measurement can be achieved.

Figure 3:
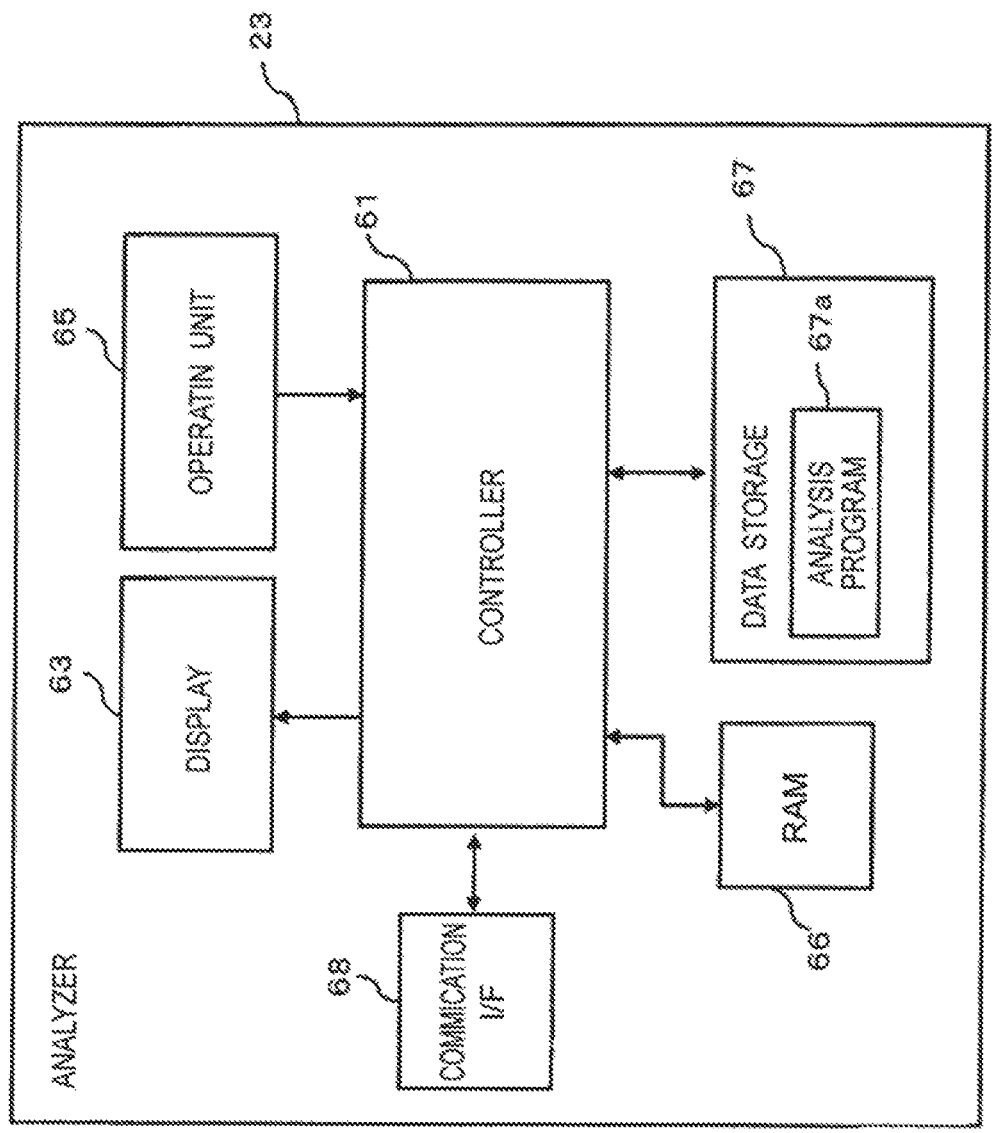
FIG. 3 is a diagram illustrating the configuration of an analyzer in the gas analysis device.

FIG. 3 is a diagram for description of a specific configuration of the analyzer 23. The analyzer 23 may be realized by, for example, a computer (information processing device). The analyzer 23 includes a controller 61 for controlling entire operation thereof, a display unit 63 for displaying various kinds of information, an operation unit 65 through which an user performs an operation, a RAM 66 for temporarily storing data, a data storage unit 67 for storing data and computer programs, and a communication interface 68 for performing communication with an external instrument (in particular, a portable information terminal 1).

The display unit 63 is realized by, for example, a liquid crystal display, an organic EL display, or LEDs. The display unit 63 is capable of displaying two-dimensional images illustrating the concentration distribution and temperature distribution of gas. The operation unit 65 is a user interface such as a button or a touch panel to receive user's operation.

The communication interface 68 is a circuit (module) for performing communication in accordance with a predetermined communication standard (for example, USB, HDMI (registered trademark), WiFi, or Bluetooth (registered trademark)).

The RAM 66 is realized by, for example, a semiconductor device such as a DRAM or an SRAM, temporarily stores data, and functions as a work area of the controller 61.

The data storage unit 67 is a recording medium for storing, for example, parameters necessary for achieving predetermined functions, a control program 67a, and measurement data. The data storage unit 67 is realized by, for example, a hard disk drive (HDD) or a solid state device (SSD).

The controller 61 executes the control program 67a to achieve predetermined functions as described later. The controller 61 may be a dedicated hardware circuit designed to achieve functions as described later. The controller 61 may be realized by a CPU, an MPU, a DSP, an FPGA, an ASIC, or the like. The control program 67a may be provided in a recording medium such as a DVD-ROM or a CD-ROM or may be downloaded from a server on a network through a communication line.

2. Operation

The following describes operation of the gas analysis device 1 configured as described above.

The gas analysis device 1 measures (analyzes) the concentration and temperature of measurement target gas in the measurement place (for example, a combustion room in a cylinder of an engine) by irradiating the measurement target gas with a laser beam output from the laser 11 while scanning the wavelength of the laser beam, and analyzing an absorption spectrum of the laser beam obtained through the irradiation. For measuring concentration and temperature of measurement target gas, the measurement cell 30 is attached to a combustion engine such that the measurement place is included in the opening 35 of the measurement cell 30.

The laser 11 outputs, for example, a laser beam in a wavelength band including a particular wavelength absorbed by components of measurement target gas. The laser 11 may output a laser beam in a wavelength band including a particular wavelength which is not absorbed by components of the measurement target, or a wavelength which is absorbed by components of the gas other than the measurement target gas.

A laser beam emitted from the laser 11 is input to the fiber splitter 15. The fiber splitter 15 branches the laser beam from the laser 11 into the collimators 17 in the optical adapters 51a and 51b. The laser beams input to the collimators 17 are then input to the optical paths 33a to 33r provided in the housing of the measurement cell 30. The laser beams input to the optical paths 33a to 33r transmit through the holding frame 42 and the window member 44 and are incident on the measurement place (the opening of the measurement cell 30).

When transmitting through the gas, a particular wavelength component of the light incident on the measurement place (opening 35 of the measurement cell 30) is absorbed by the measurement target gas included in gas in the measurement place. The laser beams having passed through the measurement place (opening 35 of the measurement cell 30) are incident on the optical paths 34a to 34r on the light receiving side through the window member 44 and the holding frame 42, and then incident into the photoreceivers 19 disposed in the optical adapters 53a and 53b. The photoreceivers 19 convert the received laser beams into electric signals.

The electric signals from the photoreceivers 19 are amplified and converted into digital signals by the amplifier 21, and input to the analyzer 23.

The analyzer 23 restructures two-dimensional images illustrating the concentration and/or temperature distribution of the gas component based on the waveforms of the signals from the photoreceivers 19. The analyzer 23 performs the two-dimensional image reconstruction by using a computed tomography (CT) technology.

The following describes in detail two-dimensional image reconstruction processing (hereinafter referred to as "CT analysis processing") performed by the analyzer 23 according to the present embodiment.

2.1 Absorption Spectroscopy

The concentration and temperature of measurement target gas can be measured by irradiating the measurement target gas with a laser beam and calculating the ratio $(I_\lambda/I_{\lambda 0})$ of the intensity of transmitted light $(I_\lambda)$ to the intensity $(I_{\lambda 0})$ of incident light when the laser beam passes through the measurement target gas (absorption medium). The ratio $(I_\lambda/I_{\lambda 0})$ of the intensity of transmitted light to the intensity of incident light is expressed by the following equation.

$$I_\lambda/I_{\lambda 0} = \exp^{-A_\lambda} = \exp\left\{-\sum_i \left(n_i L \sum_j S_{i,j}(T) G_{V_{i,j}}\right)\right\} \quad (1)$$

$\lambda$: wavelength of laser beam
$A_\lambda$: Absorbance at wavelength $\lambda$
$n_i$: Number density of molecules at i
$L$: Path length
$S_{i,j}(t)$: Absorption line intensity
$T$: Temperature
$G_{vi,j}$: Absorption line broadening function The absorbance $A_{\lambda,p}$ at each path p is expressed by the following equation.

$$A_{\lambda,p} = \sum_q n_q \alpha_{\lambda,q} L_{p,q} = n_1 \alpha_{\lambda,1} L_{p1} + \ldots + n_q \alpha_{\lambda,q} L_{pq} \quad (2)$$

$$= -\ln\left(\frac{I_\lambda}{I_{\lambda 0}}\right)$$

Figure 4:
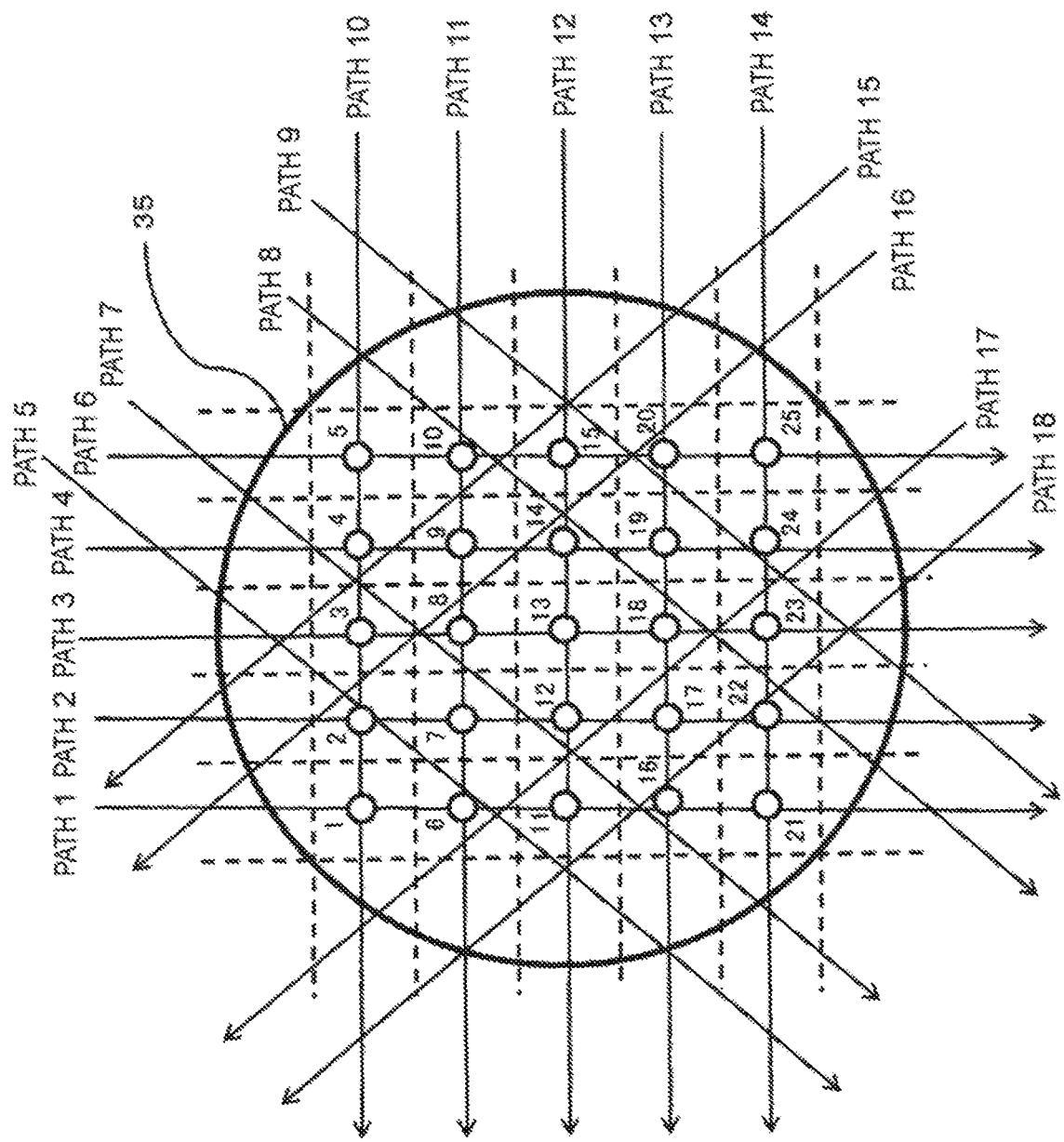
FIG. 4 is a diagram for explaining paths and grids.

$A_{\lambda,p}$: Absorbance at each pass p
$n_p$: Number density of molecules (concentration) in grid q
$\alpha_{\lambda,q}$: Absorptivity in grid q
$L_{p,q}$: Path length of path p passing through grid q
$\lambda$: wavelength of laser beam
p: Pass number
q: Grid number Paths and grids are set as illustrated in FIG. 4. Specifically, grids 1 to 25 are set at the centers of rectangular regions disposed in a lattice in a plane region in the opening 35 of the measurement cell 30. The position of each grid is expressed in XY coordinates. The paths are optical paths extending from the collimators 17 to the respective opposing photoreceivers 19 in the plane region in the opening 35. As illustrated in FIG. 4, eighteen paths (paths 1 to 18) are provided in the present embodiment.

According to Equation (2), the absorbance $A_{\lambda,p}$ at a certain wavelength can be calculated from the concentration (n) and absorptivity ($\alpha_{\lambda,q}$) of measurement target gas and the path length (L). Since the path length (L) is a known value, the absorbance $A_{\lambda,p}$ can be calculated for each path (p) once the concentration (n) and absorptivity ($\alpha_{\lambda,q}$) of the measurement target gas are known for each of a plurality of grids (q) included in the path. The absorptivity ($\alpha_{\lambda,q}$) is a function of the temperature (T). Accordingly, in other words, the absorbance $A_{\lambda,p}$ can be calculated for each path (p) once the concentration (n) and temperature (T) of the measurement target gas are known for each of a plurality of grids (q) included in the path.

Figures 5A, 5B:
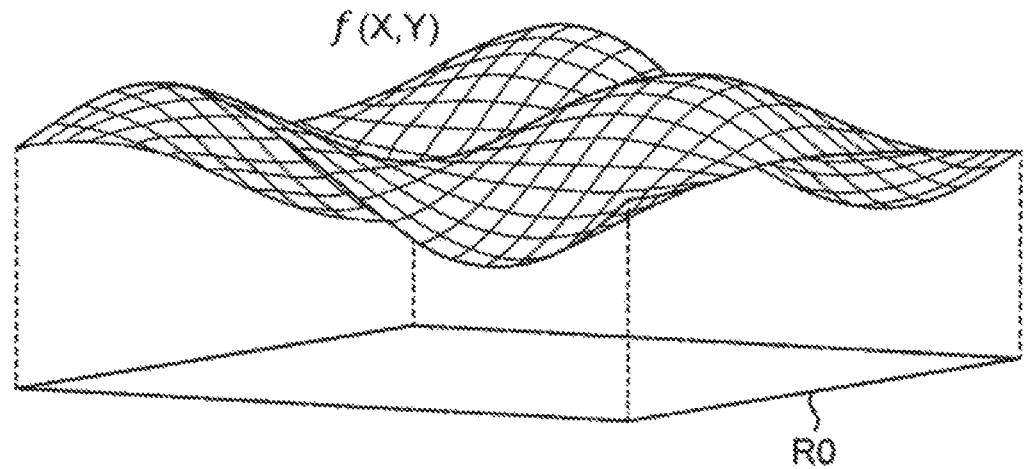
FIGS. 5A and 5B are diagrams for explaining a two-dimensional polynomial defined for CT analysis.

Thus, in the CT analysis processing according to the present embodiment, a function as illustrated in FIG. 5A, for example, an m-th order two-dimensional polynomial that defines planar distributions of the concentration (n) and temperature (t) of the target gas, is defined for the concentration (n) and temperature (t) of the target gas, respectively. The equation illustrated in FIG. 5A is a function that defines a concentration distribution or a temperature distribution for a region R0 as an analysis target. In the equation, X and Y represent coordinates of an XY coordinate system set on the region R0, and $a_{k-i,i}$ represents a coefficient of each term. Then, a theoretical value of the absorbance is calculated by using functions (m-th order two-dimensional polynomials) related to a concentration distribution and a temperature distribution, and compared with a measured value of the absorbance to calculate the coefficient $a_{k-i,i}$ when an error between the theoretical value and the measured value is minimized. Thus, the functions (m-th order two-dimensional polynomial) that define the planar distributions of the concentration (n) and temperature (t) of the target gas are determined. In other words, the concentration distribution and temperature distribution of the measurement target gas are determined.

Specifically, the m-th order two-dimensional polynomial (function) is set for each of the concentration and temperature of the gas as described below.

A concentration distribution function n(X,Y) is set as, for example, an m-th order two-dimensional polynomial as follows.

$$n(X, Y) = \sum_{k=o}^{m} \sum_{i=0}^{k} a_{k-i,i} X^{k-i} Y^i \quad (3)$$

In Equation (3), the concentration distribution function n(X,Y) is determined when a coefficient $a_{k-i,i}$ is determined.

A temperature distribution function T(X,Y) is set as, for example, an m-th order two-dimensional polynomial as follows.

$$T(X, Y) = \sum_{k=o}^{m} \sum_{i=0}^{k} b_{k-i,i} X^{k-i} Y^i \quad (4)$$

In Equation (4), the temperature distribution function T(X,Y) is determined when a coefficient $b_{k-i,i}$ is determined.

2.2 CT Analysis

The gas analysis device 1 emits laser beams toward the opening 35 two-dimensionally in a plurality of directions, receives laser beams transmitted through the opening 35, calculates an absorbance based on the intensity of the received light, and analyzes the combustion state (concentration and temperature) of gas in a region in the opening 35 of the measurement cell 30 based on the absorbance.

Figure 6:
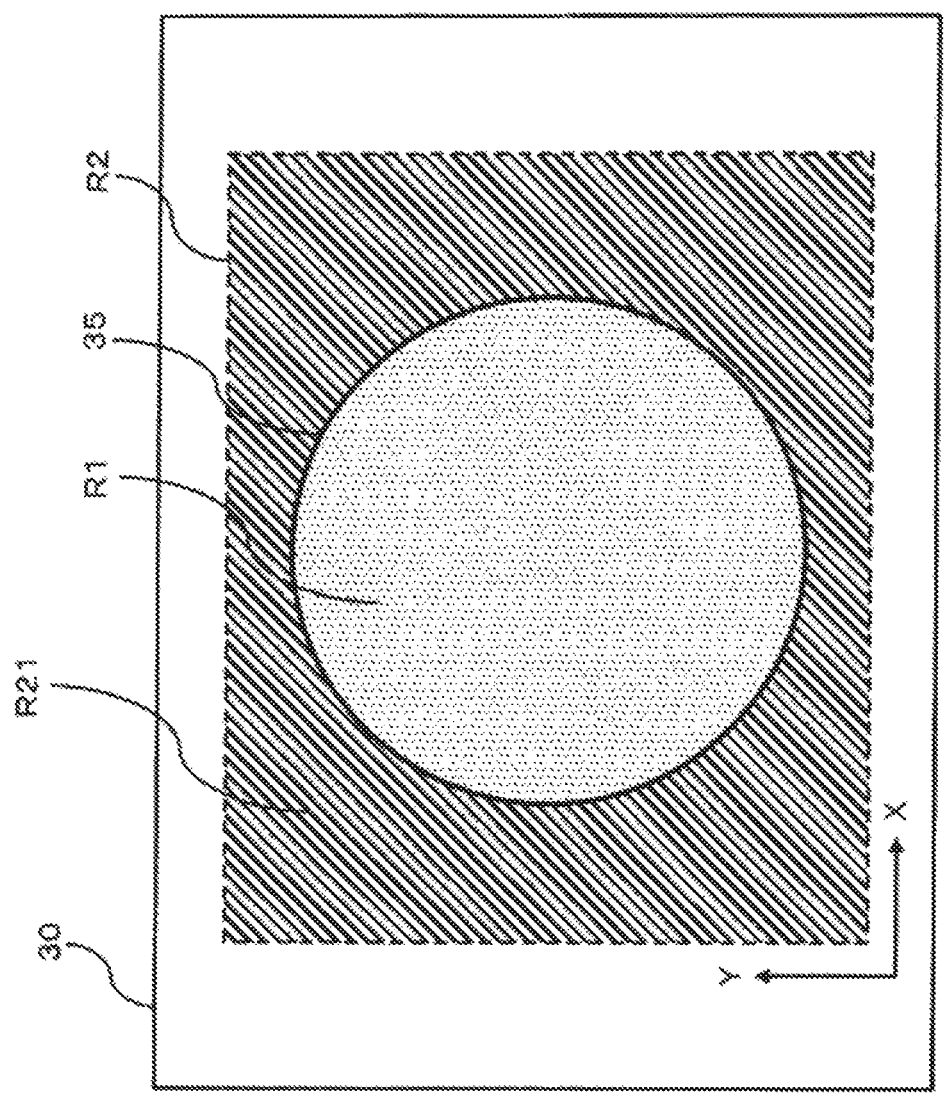
FIG. 6 is a diagram for explaining an analysis region related to CT analysis.

FIG. 6 is a diagram showing an analysis region in the CT analysis processing performed by the gas analysis device 1. A region R1 in the opening 35 in the measurement cell 30 is a measurement region. In the CT analysis processing, a region R2 which is larger than the measurement region R1 and includes the measurement region R1 is set as an analysis region.

Functions (for example, m-th order two-dimensional polynomials), such as Equations (3) and (4), that define concentration and temperature distributions of the measurement target gas are set for the region R1 in the analysis region R2. A restriction condition is set for a region R21 (hatched region in FIG. 6) outside of the region R1 in the analysis region R2. Specifically, upper limit values of functions (concentration and temperature) are set in the region R21, or a function that provides a fixed value is set for the region R21. In a peripheral part (region close to the outer periphery end) of the region R1, there are not many paths, and therefore "values calculated by functions that define concentration and temperature distributions, respectively" would largely deviate from "actual concentration and temperature values" (measurement accuracy largely decreases) in some cases. Thus, by setting the restriction condition for the region R21 in this manner and performing calculation for a region including the region R21, it is possible to prevent the measurement accuracy near the boundary between the region R1 and the region R21 from decreasing.

For the region R1, the two-dimensional polynomial that defines the concentration or temperature distribution of the measurement target gas is determined, by calculating the coefficients $a_{k-i,i}$ and $b_{k-i,i}$ in Equations (3) and (4) by using a measured value of the measurement target gas.

Figure 7:
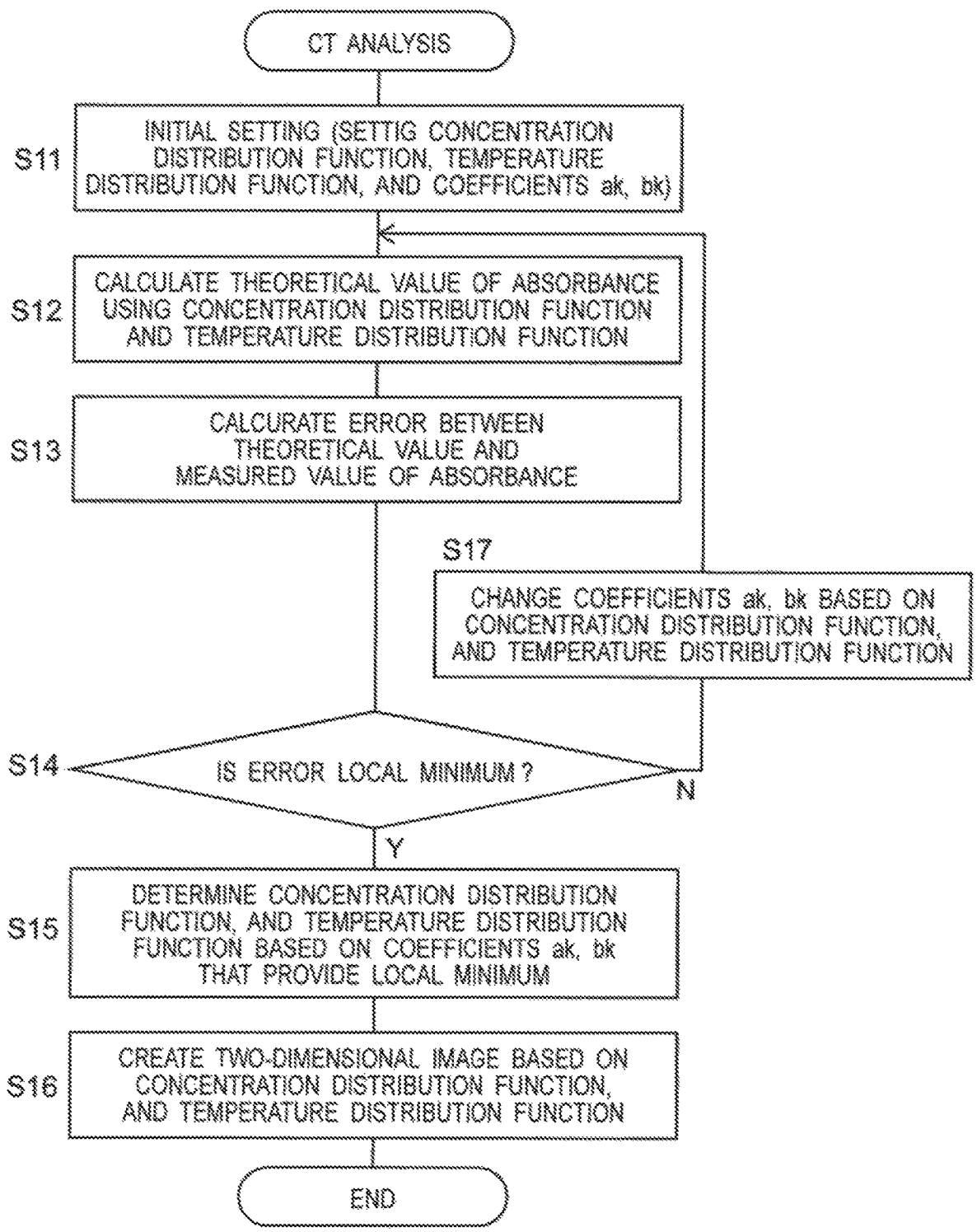
FIG. 7 is a diagram illustrating a flowchart of CT analysis processing.

FIG. 7 is a flowchart illustrating the CT analysis processing executed by the controller 61 of the analyzer 23. The following describes the analysis processing with reference to the flowchart illustrated in FIG. 7.

First, the controller 61 sets the concentration distribution function n(X,Y) and temperature distribution function T(X,Y) of the measurement target gas in initial setting (S11). Specifically, the controller 61 sets the value of the order m in each of Equations (3) and (4) and the initial values of the coefficients $a_k$ and $b_k$. The order m is set to be, for example, 2.

Subsequently, the controller 61 calculates a theoretical value of the absorbance A by using the concentration distribution function n and the temperature distribution function T (S12). Specifically, the controller 61 calculates the absorbance $A_{\lambda,p}$ for each path (p) and each of a plurality of sampled wavelengths ($\lambda$) by using Equation (2). The absorbance $A_{\lambda,p}$ is obtained by calculating $n_q \alpha_{\lambda,q} L_{p,q}$ for each grid (q) and then summing $n_q \alpha_{\lambda,q} L_{p,q}$ of all grids. The concentration distribution $n_q$ is calculated by using Equation (3). The absorptivity $\alpha_{\lambda,q}$ is calculated based on a temperature calculated by using Equation (4).

Subsequently, the controller 61 calculates error between the theoretical value of the absorbance and the measured value of the absorbance based on Expression (5) below (S13). Specifically, the error between the theoretical value $((A_{\lambda,p})_{theo})$ of the absorbance and the measured value $((A_{\lambda,p})_{exp})$ of the absorbance is calculated in the following manner.

Procedure 1) The square of the difference between the theoretical value and measured value of the absorbance $(A_{\lambda,p})$ is calculated for each path (p) and each wavelength ($\lambda$). The measured value of the absorbance is calculated based on information of a laser beam received by the photoreceiver 19 on each path.

Procedure 2) The theoretical value of the square of the difference is summed over all wavelengths for each path (p).

Procedure 3) The value of the square of the difference calculated for each path (p) is summed over all paths to calculate the error.

$$\text{Error} = \sum_p \sum_\lambda \{(A_{\lambda,p})_{theo} - (A_{\lambda,p})_{exp}\}^2 \quad (5)$$

The controller 61 determines the coefficients $a_k$ and $b_k$ providing error to be a local minimum (S14), while changing the coefficients $a_k$ and $b_k$ of the concentration distribution function n and the temperature distribution function T (S17) and repeating the above-described processing predetermined times (S14). In this calculation, the coefficient $a_k$ of the concentration distribution function n and the coefficient $b_k$ of the temperature distribution function T may be simultaneously changed. Alternatively, the coefficient $a_k$ of the concentration distribution function n and the coefficient $b_k$ of the temperature distribution function T may be changed in turn. Specifically, a step (step A) of optimizing the concentration distribution function n while the coefficient $b_k$ of the temperature distribution function T is not changed, and a step (step B) of optimizing the temperature function T while the coefficient $a_k$ of the concentration distribution function n is not changed may be repeated.

When coefficients $a_k$ and $b_k$ by which the error is at a local minimum are detected, the controller 61 determines the concentration distribution function n and the temperature distribution function T by using the coefficients (S15). The controller 61 generates images each indicating the concentration distribution and the temperature distribution in the measurement region by using the determined concentration distribution function n and the determined temperature distribution function T, respectively (S16). Data of the generated images is stored in the data storage unit 67. The images indicating the concentration distribution and the temperature distribution are displayed on the display unit 63, respectively.

Figure 8:
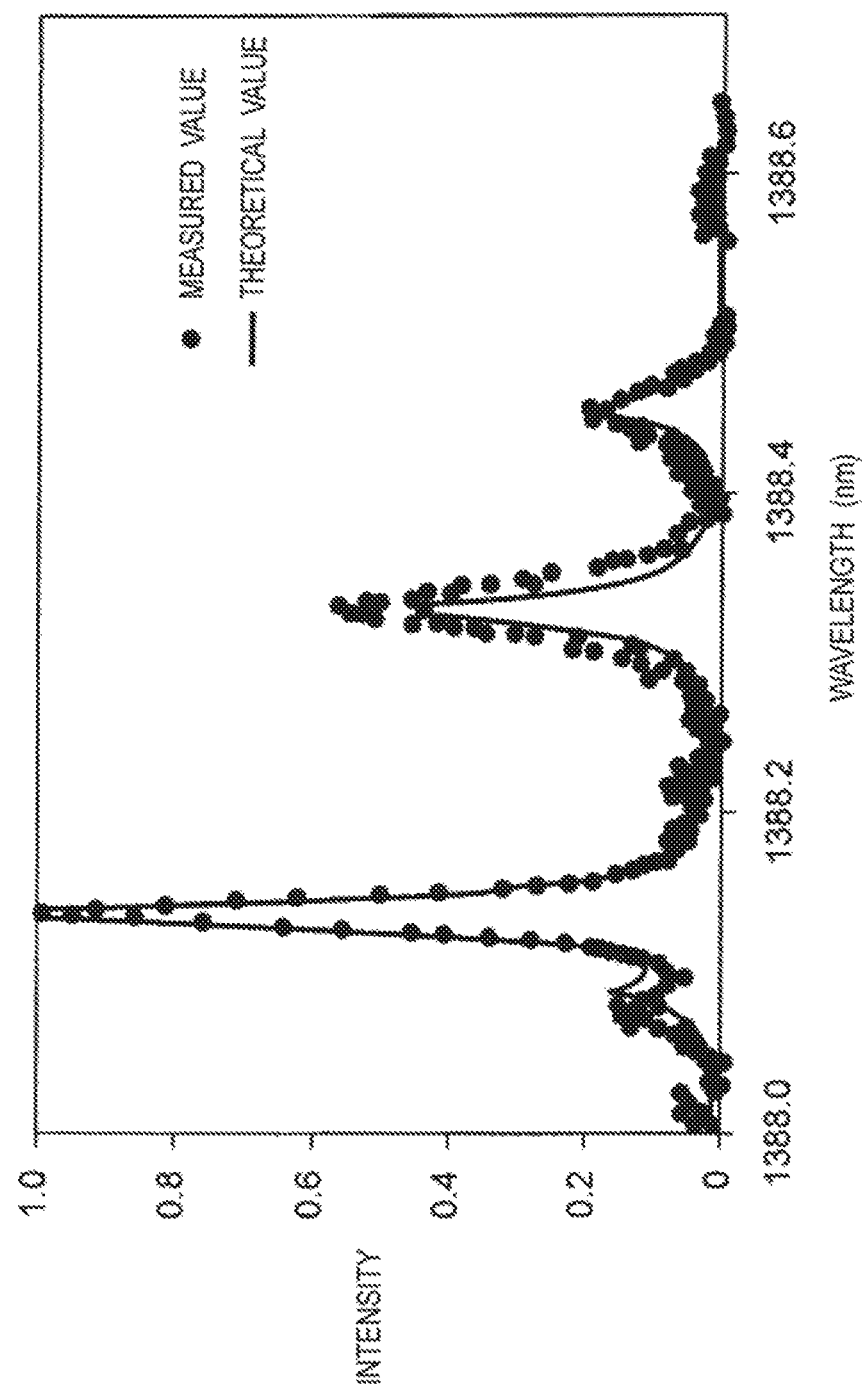
FIG. 8 is a diagram illustrating calculated and measured values of absorbance in comparison.

FIG. 8 is a diagram illustrating the measured value $((A_{\lambda,p})_{exp})$ of the absorbance, and the theoretical value $((A_{\lambda,p})_{theo})$ of the absorbance calculated by using the concentration distribution function n and the temperature distribution function T obtained by the above-described CT analysis method, in comparison for one path. As illustrated in FIG. 8, the theoretical value $((A_{\lambda,p})_{theo})$ is accurately obtained with respect to the measured value $((A_{\lambda,p})_{exp})$ of the absorbance.

Figure 9:
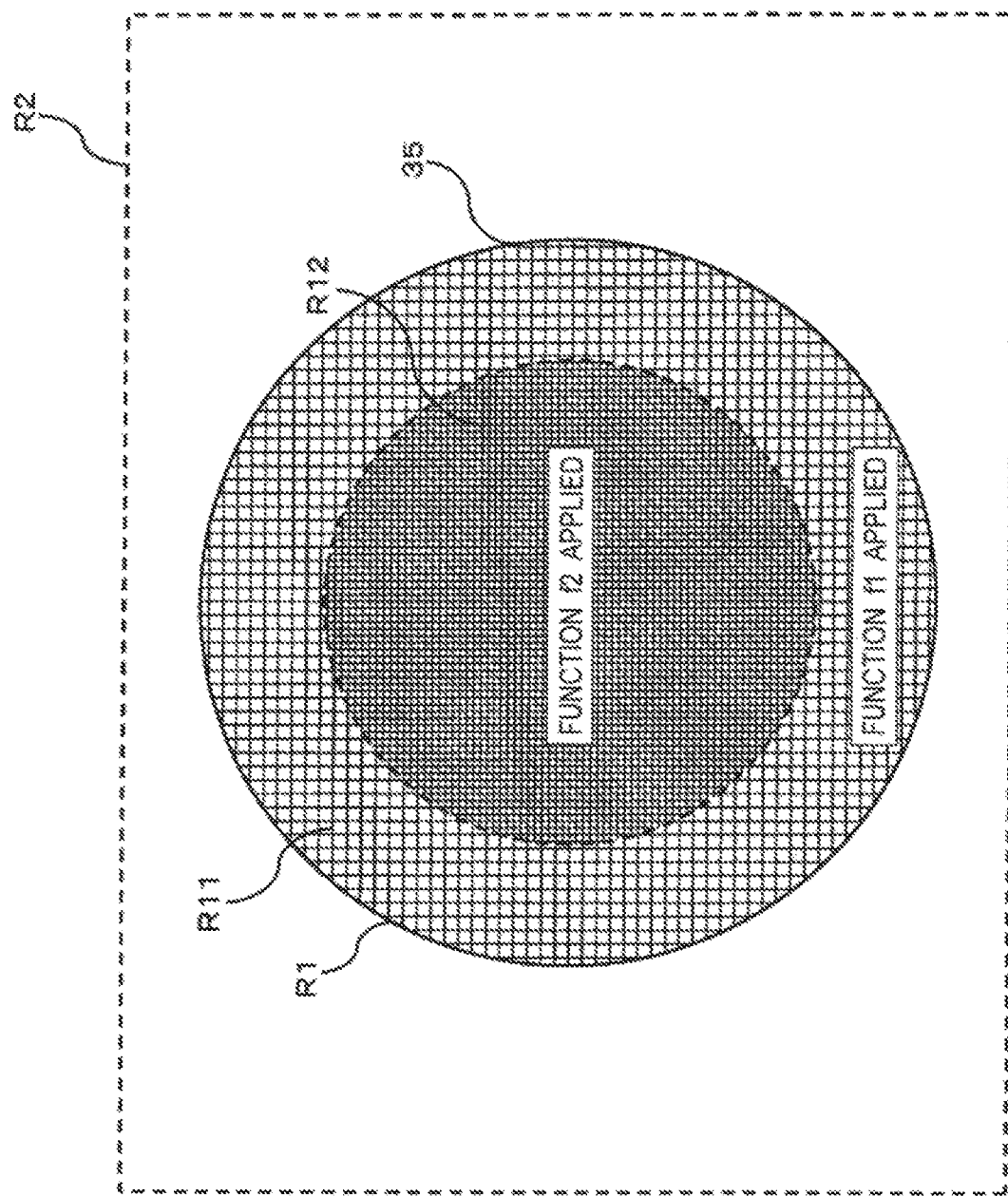
FIG. 9 is a diagram for explaining application of functions (two-dimensional polynomials) having different resolutions to different regions.
Figure 10B:
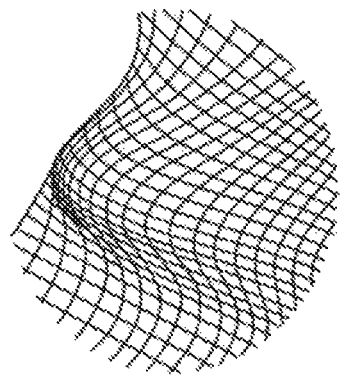
FIGS. 10A and 10B are diagrams for explaining functions (two-dimensional polynomials) having different spatial resolutions.
Figure 10A:
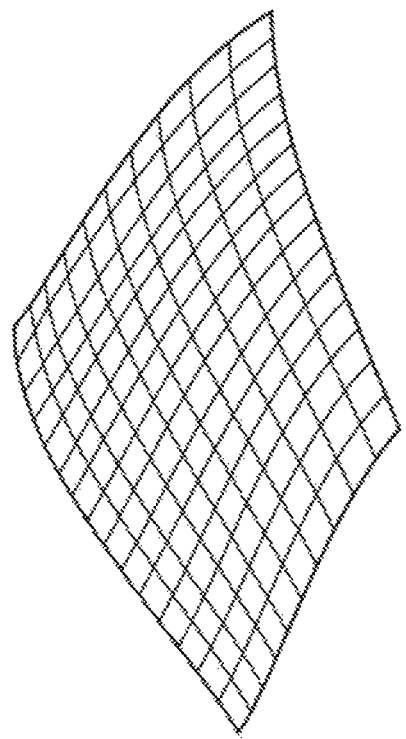

In the above-described embodiment, only one kind of a concentration distribution function and one kind of a temperature distribution function are defined for the concentration and temperature of gas, respectively. However a plurality of kinds of function may be set. Specifically, the concentration function n and/or the temperature function T used in the analysis may be changed in accordance with the analysis region. For example, as illustrated in FIG. 9, in the region R1 corresponding to the opening 35, functions that define the concentration distribution and the temperature distribution may be different between a region R12 at a central part and a region R11 outside thereof. Due to path arrangement, information can be obtained from a relatively large number of paths in the region R12 at the central part, while information can be obtained only from a relatively small number of paths in the region R11 outside the region R12. Accordingly, as illustrated in FIGS. 10A and 10B, two kinds of functions $f_1$ and $f_2$ having different spatial resolutions are prepared. The function f2 having higher resolution is applied to the region R12 in which information can be obtained from a relatively large number of paths, and the function f1 having lower resolution is applied to the region R11 in which information can be obtained only from a relatively small number of paths. In this manner, the spatial resolution in the region R12 can be improved. In other words, spatial resolution can be improved for a particular region by selectively using the functions $f_1$ and $f_2$ in accordance with path arrangement.

Figure 11A:
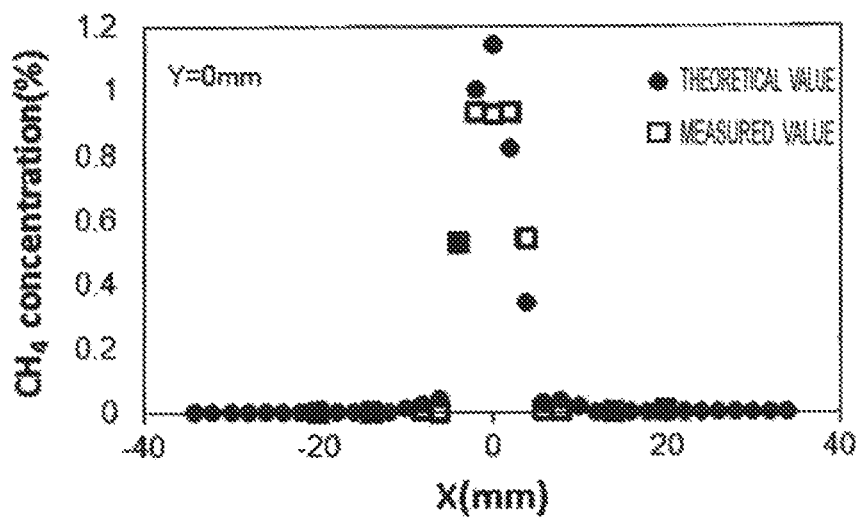
FIGS. 11A and 11B are diagrams illustrating a calculation result when the order of a function (two-dimensional polynomial) is appropriately or inappropriately set.
Figure 11B:
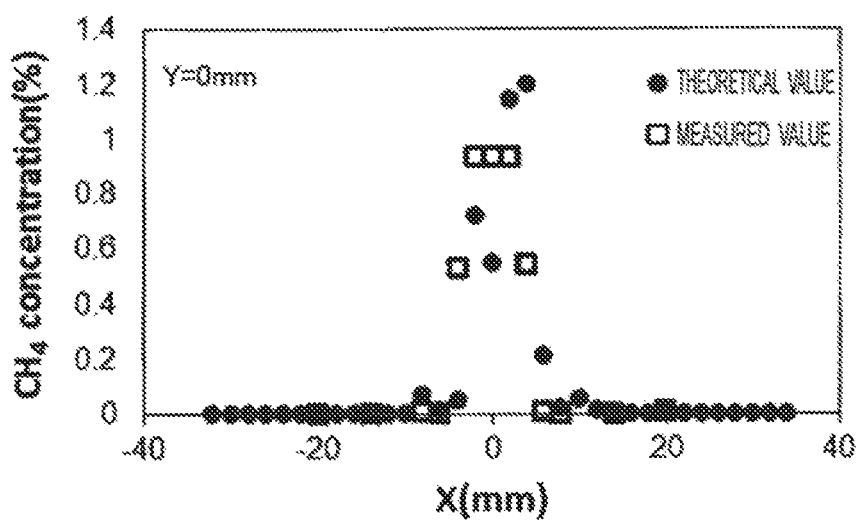

The spatial resolution depends on the arrangement of laser paths, and cannot be equal to or smaller than the interval between the laser paths. Thus, in image reconstruction, the orders m of functions of the concentration distribution and/or the temperature distribution are set so that a spatial resolution is not equal to or smaller than the interval of laser paths. FIGS. 11A and 11B are diagrams each illustrating a theoretical value and a measured value of the concentration of measurement target gas (methane (CH4)) in comparison with each other. FIG. 11A shows a case in which the order m of a function that defines the concentration is appropriately set, and FIG. 11B shows a case in which the order m of a function that defines the concentration is too large. As illustrated in FIG. 11B, when the order m is too large, a hunting occurs in the theoretical value. When a hunting occurs in a calculation result as illustrated in FIG. 11B, the order m of the function needs to be adjusted to a lower value so as to cause no hunting.

2.3 Extension to Three-Dimensional Region

The idea of the present embodiment can be extended to measurement of the temperature and concentration of gas in a three-dimensional region. For example, in measurement in a three-dimensional region, the concentration distribution function n(X,Y,Z) in the three-dimensional space can be set as an m-th order three-dimensional polynomial, as described below.

$$n(X, Y, Z) = \sum_{k=o}^{m} \sum_{i=o}^{k} \sum_{j=0}^{i} a_{k-i,i-j,j} X^{k-i} Y^{i-j} Z^j \quad (6)$$

Similarly to analysis for a two-dimensional region, the concentration distribution function n(X,Y,Z) in a three-dimensional region is determined by determining the coefficient $a_{k-i,i-j,j}$ in Equation (6). An optimization step same as that of the above-described two-dimensional case is applied. Similarly to the concentration distribution, the temperature distribution in a three-dimensional region can be obtained by setting an m-th order three-dimensional polynomial as the following equation.

$$T(X, Y, Z) = \sum_{k=o}^{m} \sum_{i=o}^{k} \sum_{j=0}^{i} b_{k-i,i-j,j} X^{k-i} Y^{i-j} Z^j \quad (6)$$

3. Conclusion

The gas analysis device 1 according to the present embodiment is a device for analyzing the physical state (for example, concentration distribution or temperature distribution) of measurement target gas in a two-dimensional or three-dimensional region. The gas analysis device 11 includes the laser 11 for outputting a laser beam, the laser control device 14 for controlling the laser 11, the fiber splitter (beam splitter) 15 for dividing the laser beam from the laser 11 into plural beams corresponding to a plurality of optical paths, the collimators 17 and the measurement cell 30 (an example of irradiation unit) for irradiating a measurement region including measurement target gas with the divided laser beams in a plurality of directions, a plurality of photoreceivers 19, each for receiving laser beams having passed through the measurement region to output an electric signal in accordance with intensity of the received laser beam, and the analyzer 23 for analyzing a physical state of the measurement target gas based on the electric signal output from each photoreceiver 19. The analyzer 23 sets a multi-dimensional polynomial (Equations (3), (4), (6), or (7) (an example of function)) representing the physical state (for example, concentration distribution or temperature distribution) of the measurement target gas at least in the measurement region. The analyzer 23 measures the physical state of the measurement target gas by determining a coefficient $(a_{k-i,i}, b_{k-i,i}), (a_{k-i,i-j,j}, b_{k-i,i-j,j})$ of each of terms included in the multi-dimensional polynomial based on a measured value obtained from the electric signal output from the photoreceiver 19.

The present embodiment also discloses a gas analysis method of analyzing a physical state (for example, concentration distribution or temperature distribution) of measurement target gas in a two-dimensional or three-dimensional region. The gas analysis method includes the steps of: irradiating a measurement region including measurement target gas with laser beams in a plurality of directions; receiving laser beams having passed through the measurement region; and analyzing a physical state (for example, concentration distribution or temperature distribution) of the measurement target gas based on information of the received laser beams. The analyzing step sets a multi-dimensional polynomial (Equations (3), (4), (6), or (7) (an example of function)) representing the physical state of the measurement target gas at least in the measurement region, and determines a coefficient $(a_{k-i,i}, b_{k-i,i}), (a_{k-i,i-j,j}, b_{k-i,i-j,j})$ of each term included in the multi-dimensional polynomial by using a measured value obtained from the information of the received laser beam.

The gas analysis device and the gas analysis method as described above can accurately analyze the measurement target gas in a short time. Accordingly, a two-dimensional image can be accurately reconstructed when the combustion state, which momentarily changes, needs to be determined in real time.

Embodiment 2

The present embodiment describes exemplary applications of the gas analysis device 1 described in Embodiment 1 to various kinds of combustion engines.

A) Exemplary Application 1

Figure 12:
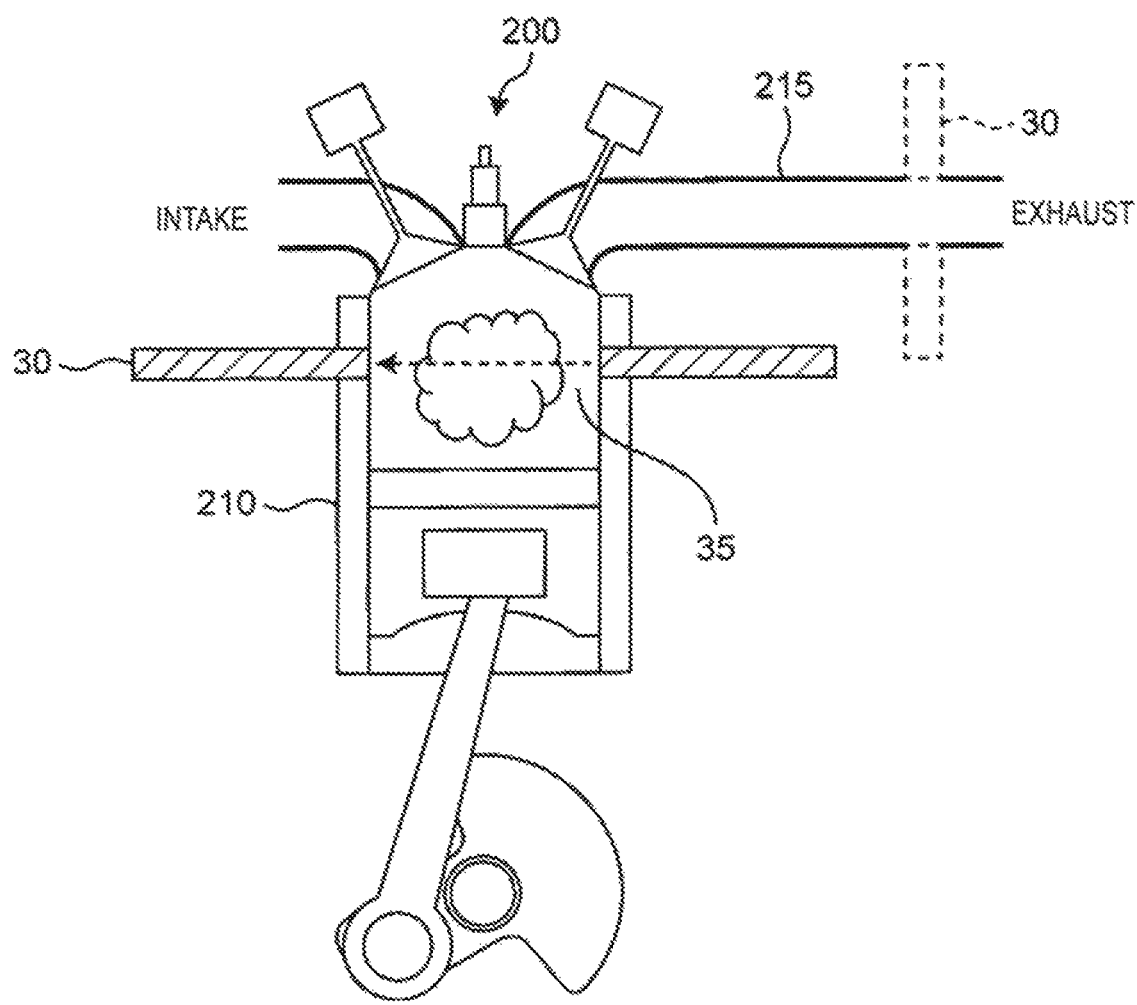
FIG. 12 is a diagram for explaining exemplary application of the measurement cell according to the embodiment of the present invention to an engine.

FIG. 12 is a diagram for explaining attachment of the measurement cell 30 to an engine when applying the gas analysis device 1 to the engine. As illustrated in FIG. 12, the measurement cell 30 is disposed at an upper part of a cylinder 210 of an engine 200 with the opening 35 of the measurement cell 30 positioned in a combustion room of this engine 200. Disposing the measurement cell 30 in this manner allows combustion gas in the combustion room in the engine 200 to be irradiated with laser beams, and laser beams having passed through the combustion gas to be measured, so that the combustion state (concentration or temperature) of the combustion gas can be analyzed two-dimensionally by using a conductor laser absorption method.

In the above-described example, the measurement cell 30 is disposed with the opening 35 of the measurement cell 30 located at the combustion room of the engine 200. However, the measurement cell 30 may be located at, in place of the combustion room, an exhaust pipe which is a path of exhaust gas discharged from the cylinder 210. With this configuration, the state of the exhaust gas can be measured and analyzed. Alternatively, a plurality of the measurement cells 30 may be provided to the cylinder 210 or the exhaust pipe side by side in the normal direction of the measurement cells 30. With this configuration, the gas state can be three-dimensionally measured.

As described above, the gas analysis device 1 including the measurement cell 30 according to the present embodiment can detect the temperature and concentration of various kinds of gas in a cylinder or discharge system of an engine, and thus is useful for understanding of a transient combustion phenomenon and an unburned fuel discharge behavior.

B) Exemplary Application 2

The gas analysis device 1 according to the above-described embodiment can be applied to detection of the combustion state (temperature or concentration of target gas) in a combustion room of a boiler burner used in, for example, a thermal power plant. FIG. 13A is a diagram explaining application of the above-described gas analysis device 1 to such a boiler burner. For example, as illustrated in FIG. 13A, the measurement cell 30 is disposed with the opening 35 of the measurement cell 30 located at a combustion room 110 of a boiler. With this configuration, the combustion state in the combustion room 110 of a burner 100 can be two-dimensionally determined. Alternatively, as illustrated in FIG. 13B, a plurality of the measurement cells 30 may be provided to the combustion room 110 side by side in the normal direction of the measurement cells 30. With this configuration, the combustion state in a three-dimensional region can be measured.

C) Exemplary Application 3

Figure 14A:
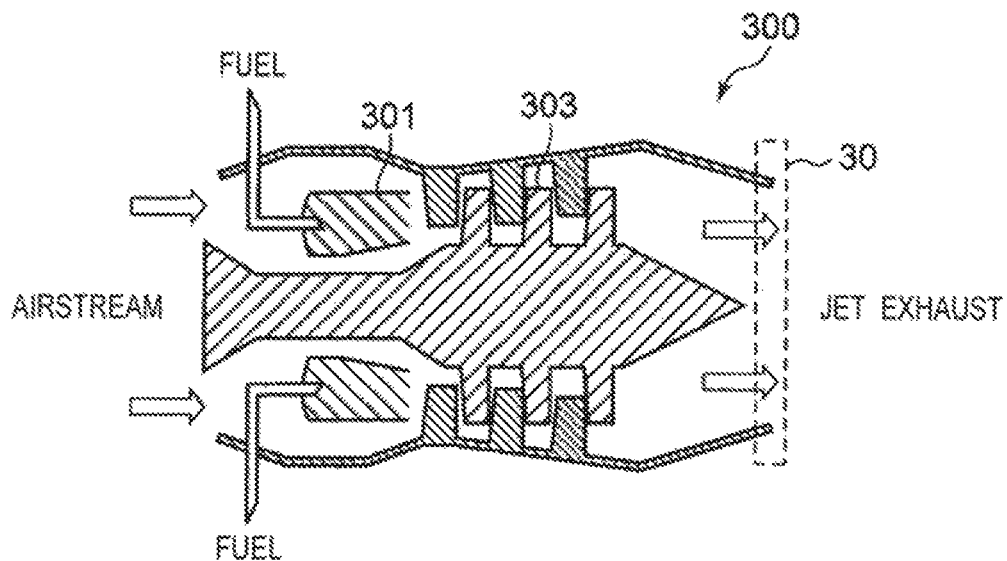
FIGS. 14A and 14B are diagrams for explaining exemplary application of measurement cell according to the embodiment of the present invention to a jet engine.
Figure 14B:
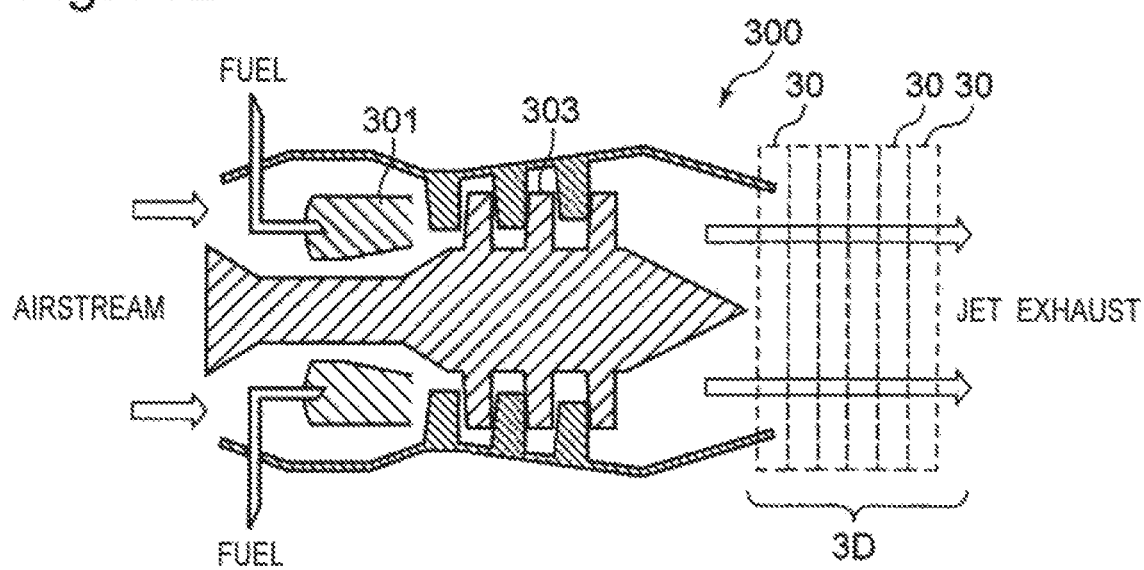

The gas analysis device 1 can be applied to detection of the combustion state (temperature or concentration of target gas) of a jet engine or an industrial gas turbine. FIG. 14A is a diagram explaining application of the gas analysis device 1 according to the present embodiment to such a jet engine. In a jet engine 300 (or gas turbine), intake airflow is compressed by a compressor driven by the rotational force of a turbine 303, and is mixed with fuel and combusted in a combustor 301. Combustion gas generated by the combustion rotates the turbine 303 and is externally discharged through an injection port. For example, the measurement cell 30 may be located near the injection port of the jet engine 300 as illustrated in FIG. 14A. With this configuration, the combustion state inside a jet fuel cylinder can be detected. Such a technology is useful for understanding of a flow field and an oscillation phenomenon due to fuel non-uniformity. Alternatively, as illustrated in FIG. 14B, a plurality of the measurement cells 30 may be provided near the injection port side by side in the direction of discharge of the combustion gas. With this configuration, the combustion state in a three-dimensional region can be detected.

As described above, applying the configuration of the gas analysis device 1 according to Embodiment 1 to a method of two-dimensionally or three-dimensionally measuring temperature and concentration distributions can achieve simplification, quantification, and high sensitivity of the device. In addition, the configuration of the gas analysis device 1 can be applied to or expanded into combustion instruments such as a boiler, an engine, and a gas turbine.

Variations

In the above-described embodiment, the gas analysis device 1 only uses one laser beam source, but may use two kinds of laser beam sources. When two kinds of laser beam sources are used, laser beams from the two kinds of laser beam sources, respectively are synthesized through a multiplexer, and then input to a fiber splitter, where the synthesized beam is divided into a plurality of optical paths.

The wavelength band of a laser beam (hereinafter referred to as a "laser beam 1") output from one of the laser beam sources is different from the wavelength band of a laser beam (hereinafter referred to as a "laser beam 2") output from the other laser beam source. For example, the wavelength band of the laser beam 1 may be set to be a wavelength band including a particular wavelength that is absorbed by a measurement target gas component, while the wavelength band of the laser beam 2 may be set to be a wavelength band including a particular wavelength that is not absorbed by the measurement target gas component. In this case, the measurement target gas component can be measured based on an absorption line observed in the absorption spectrum of the laser beam 1. Alternatively, the scanning wavelength band of the laser beam 1 may be a wavelength band including a particular wavelength (first wavelength) that is absorbed by a first measurement target gas component, while the scanning wavelength band of the laser beam 2 may be set to be a wavelength band including a particular wavelength (second wavelength) that is absorbed by another gas component (second measurement target gas) different from the first measurement target gas component. In this case, the two gas components can be simultaneously measured based on absorption lines observed in the respective absorption spectra of the laser beam 1 and the laser beam 2.

Although the gas analysis device according to the above-described embodiment determines the concentration distribution and temperature distribution of measurement target gas, analysis targets are not limited to concentration and temperature. Any physical quantity other than the concentration and temperature of gas can be analyzed in the same manner by setting a multi-dimensional polynomial (for example, two-dimensional or three-dimensional polynomial) related to the physical quantity to be measured.

The analysis method disclosed in the above-described embodiment is not limited to gas analysis but may be widely applied to CT technologies. Specifically, the analysis method is widely applicable to devices configured to irradiate a measurement object in a measurement target region (two-dimensional plane or three-dimensional space) with a measurement signal and analyze the state and structure of the measurement object based on a signal having passed through the measurement object. More specifically, a two-dimensional or three-dimensional polynomial related to a measurement item (physical quantity of a measurement object) is defined for the measurement target region (two-dimensional plane or three-dimensional space), and the coefficient of each term of the two-dimensional or three-dimensional polynomial is determined based on information of a signal having passed through the measurement target region. Accordingly, the polynomial related to the measurement item (physical quantity of the measurement object) is determined, allowing analysis of the measurement object.

The invention claimed is:

1. A gas analysis device for analyzing a physical state of measurement target gas in a two-dimensional or three-dimensional region, the gas analysis device comprising:
    a laser light source configured to output a laser beam;
    a laser control device including a driver configured to control the laser light source;
    a splitter configured to divide the laser beam from the laser light source into a plurality of beams corresponding to a plurality of optical paths;
    an irradiation unit including a measurement cell configured to irradiate a measurement region including measurement target gas with the laser beams in a plurality of directions;
    a plurality of photoreceivers each configured to receive a laser beam having passed through the measurement region, and output an electric signal in accordance with intensity of the received laser beam; and
    an analyzer including a controller and a random access memory, wherein the analyzer is configured to analyze the physical state of the measurement target gas based on the electric signal output from each photoreceiver, wherein
    the analyzer is further configured to:
    set a function representing the physical state of the measurement target gas at least in the measurement region, wherein the function is a distribution function representing a distribution of a predetermined physical quantity of the measurement target gas in the two-dimensional region, and the function is expressed in a two-dimensional or three-dimensional polynomial, and
    measure the physical state of the measurement target gas by determining a coefficient of each of terms included in the function based on a measured value obtained from the electric signal output from the photoreceiver, wherein the coefficient of each of the polynomial is a parameter independent of a position in the measurement region.

2. The gas analysis device according to claim 1, wherein the function f is expressed in a m-th two-dimensional or three-dimensional polynomial as follows, where "X", "Y", and "Z" are coordinates and "a" is a coefficient:

$$f(X, Y) = \sum_{k=0}^{m} \sum_{i=0}^{k} a_{k-i,i} X^{k-i} Y^i \text{ or}$$

$$f(X, Y, Z) = \sum_{k=0}^{m} \sum_{i=0}^{k} \sum_{j=0}^{i} a_{k-i,i-j,j} X^{k-i} Y^{i-j} Z^j.$$

3. The gas analysis device according to claim 1, wherein the function includes a function representing a concentration distribution of the measurement target gas in the two-dimensional or three-dimensional region and a function representing a temperature distribution of the measurement target gas.

4. The gas analysis device according to claim 3, wherein the analyzer is further configured to
    set, as the function, a first polynomial representing the concentration distribution of the measurement target gas and a second polynomial representing the temperature distribution of the measurement target gas, calculate a theoretical value of an absorbance of the measurement target gas by using the first and second polynomials, calculate a measured value of the absorbance of the measurement target gas based on the electric signals output from the photoreceivers, and calculate the concentration distribution of the measurement target gas and the temperature distribution of the measurement target gas by determining a coefficient of each term included in each polynomial based on error between the theoretical value of the absorbance and the measured value of the absorbance.

5. The gas analysis device according to claim 4, wherein, as the restriction, an upper limit of a value of the function is set in the predetermined outside region, or a value of the function in the predetermined outside region is set to a fixed value.

6. The gas analysis device according to claim 1, wherein the analyzer is further configured to set, as a target region to analyzed, a region including the measurement region and a predetermined region outside the measurement region, and sets restriction in the predetermined outside region.

7. The gas analysis device according to claim 1, wherein the analyzer is further configured to divide and manage the measurement region into a plurality of regions, and apply different functions in each of the divided regions.

8. The gas analysis device according to claim 1, wherein the analyzer is further configured to generate a two-dimensional image based on a measurement result of the physical state of the measurement target gas.

9. A gas analysis method of analyzing a physical state of measurement target gas in a two-dimensional or three-dimensional region, the gas analysis method comprising:
    irradiating a measurement region including measurement target gas with laser beams in a plurality of directions;
    receiving laser beams having passed through the measurement region;
    analyzing a physical state of the measurement target gas based on info on of the received laser beams,
    wherein the analyzing
    sets a function representing the physical state of the measurement target gas at least in the measurement region, wherein the function is a distribution function representing a distribution of a predetermined physical quantity of the measurement target gas in the two-dimensional or three-dimensional region, and the function is expressed in a two-dimensional or three-dimensional polynomial, and determines a coefficient of each of terms included in the polynomial of the function based on a measured value obtained from the information of the received laser beams, wherein the coefficient of the polynomial is a parameter independent of a position in the measurement region.

10. The gas analysis method according to claim 9, wherein the analyzing
    sets, as the function, a first polynomial representing a concentration distribution of the measurement target gas and a second polynomial representing a temperature distribution of the measurement target gas,
    calculates a theoretical value of an absorbance of the measurement target gas by using the first and second polynomials,
    calculates a measured value of the absorbance of the measurement target gas based on the information of the received laser beams, and
    calculates the concentration distribution of the measurement target gas and the temperature distribution of the measurement target gas by determining a coefficient of each term included in each polynomial based on error between the theoretical value of the absorbance and the measured value of the absorbance.

11. The gas analysis method according to claim 9, wherein the function f is expressed in a m-th two-dimensional or three-dimensional polynomial as follows, where "X", "Y", and "Z" are coordinates and "a" is a coefficient:

$$f(X, Y) = \sum_{k=0}^{m} \sum_{i=0}^{k} a_{k-i,i} X^{k-i} Y^i \text{ or}$$

$$f(X, Y, Z) = \sum_{k=0}^{m} \sum_{i=0}^{k} \sum_{j=0}^{i} a_{k-i,i-j,j} X^{k-i} Y^{i-j} Z^j.$$

* * * * *